H. WADSWORTH.
SILO.
APPLICATION FILED SEPT. 24, 1919.
1,359,209.
Patented Nov. 16, 1920.
2 SHEETS—SHEET 1.
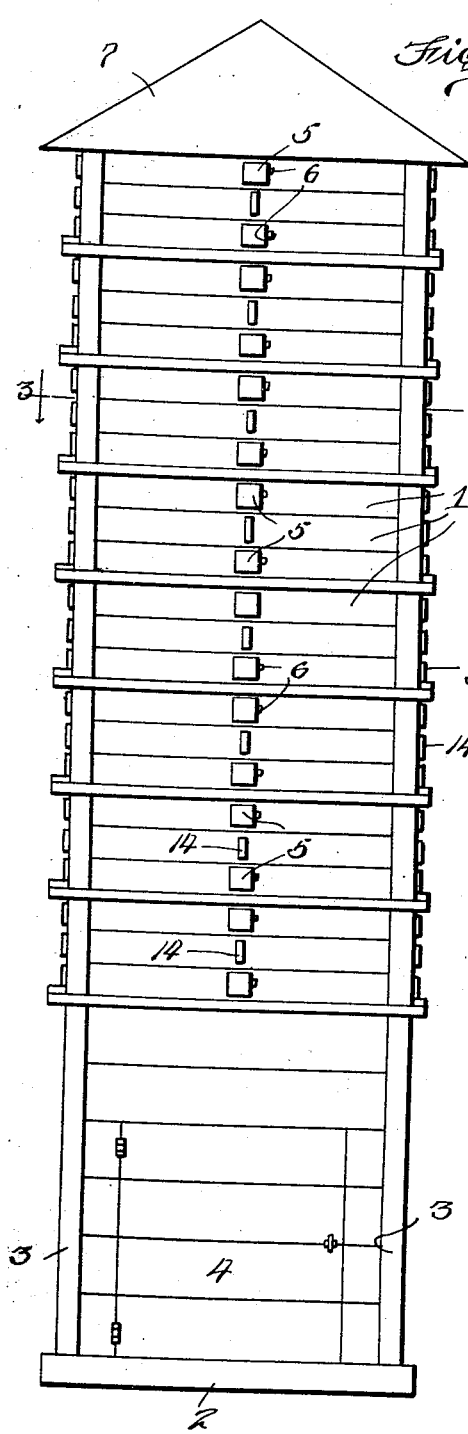
Fig. 1.
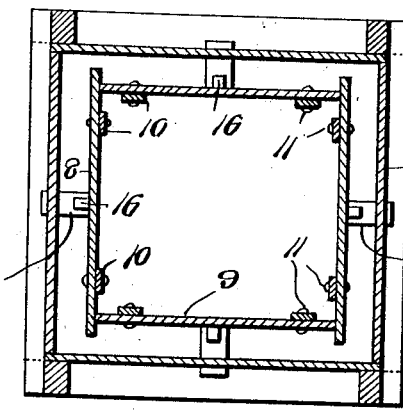
Fig. 3.
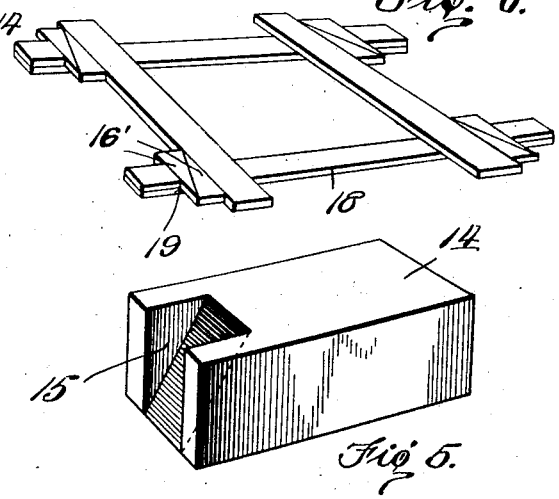
Fig. 6.
Fig. 5.
Inventor
Hobert Wadsworth
By Percy H. Moore
Atty.

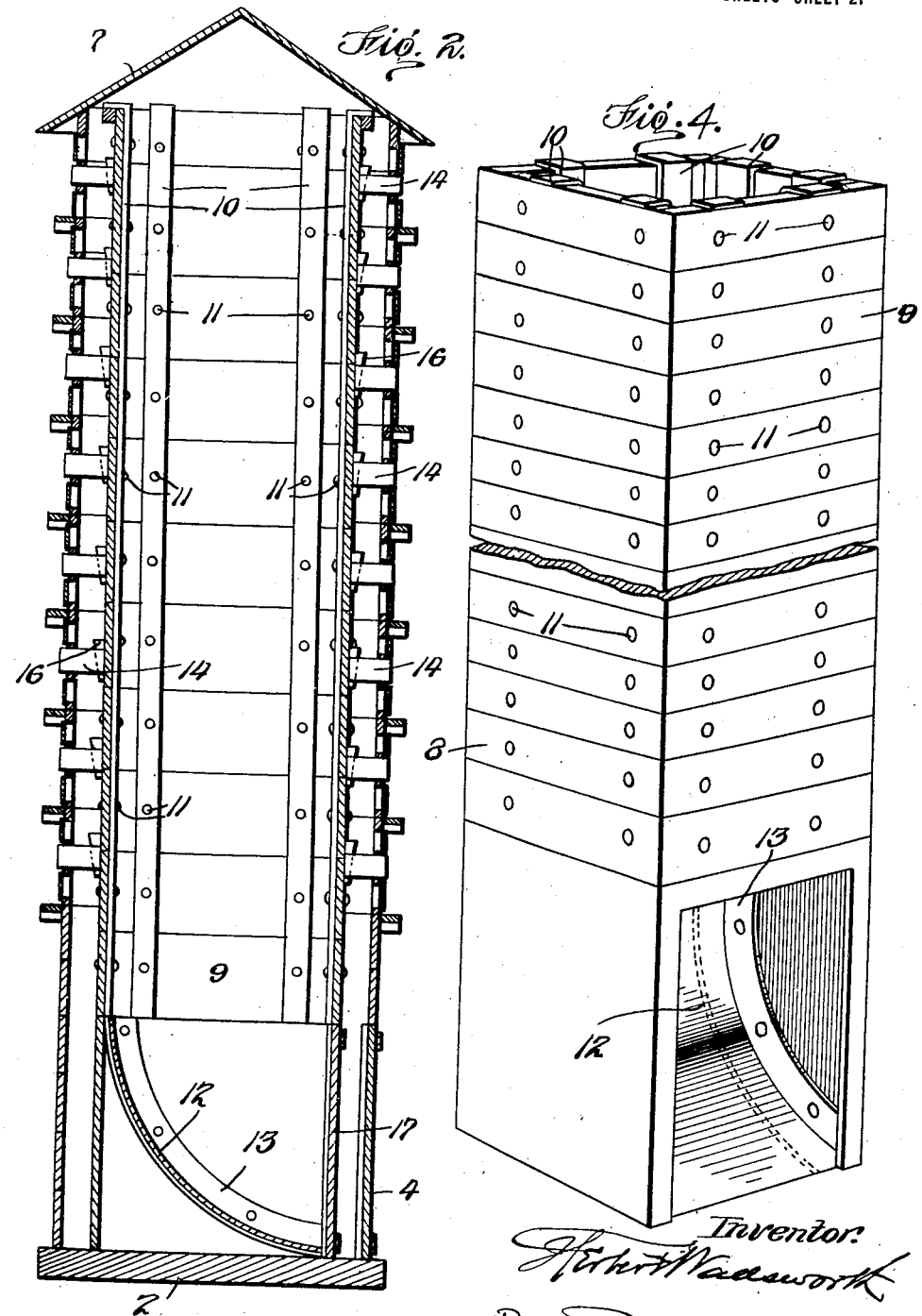

UNITED STATES PATENT OFFICE.

HERBERT WADSWORTH, OF AVON, NEW YORK.

SILO.

1,359,209.

Specification of Letters Patent. Patented Nov. 16, 1920.

Application filed September 24, 1919. Serial No. 326,033.

*To all whom it may concern:*

Be it known that I, HERBERT WADSWORTH, citizen of the United States of America, residing at Avon, in the county of Livingston and State of New York, have invented certain new and useful Improvements in Silos, of which the following is a specification.

My invention has reference to improvements in silos and has for its principal object to provide a silo constructed in a manner as will insure preservation of ensilage stored therein and allow the removal of said ensilage as needed from the bottom portion of the structure without difficulty and the necessity of taking the ensilage from the upper portion of the silo.

It is also an object of the invention to provide the silo with means for compensating for expansion and contraction of the ensilage due to variances in temperature and to permit of free discharge of the same from the discharge portion thereof.

Other objects will be in part obvious and in part pointed out hereinafter.

In order that the invention and the manner of its application may be readily understood by those skilled in the art, I have in the accompanying illustrative drawings and in the following detailed description based thereon, set forth a preferred embodiment of the invention.

In these drawings:

Figure 1 is a side elevation of my improved silo;

Fig. 2 is a vertical section through my improved silo;

Fig. 3 is a horizontal section therethrough, taken on the line 3—3 of Fig. 1;

Fig. 4 is a perspective of the silo container structure showing the hopper like discharge portion thereof;

Fig. 5 is a fragmentary detail in perspective of one of the adjusting wedges; and Fig. 6 is a detail in plan of a modified form of adjusting means.

Having more particular reference to the drawings, in connection with which like reference characters will designate corresponding parts throughout the several views, my improved silo construction includes what may be termed a super-structure or housing consisting of boards or planks 1 arranged in superposed relation and built up from a suitable base 2. These boards 1 may be and preferably are braced by means of standards 3 positioned on said base and having connection with each of said boards throughout their lengths, thus, insuring proper locking of the same. The lower portion of one side wall of the superstructure is formed with a way receiving a hanged outwardly swingable door 4 therein for an obvious purpose, while in each of the side walls at equi-distanced intervals throughout their height are openings of sufficient size to permit of the entrance of a portion of a person's body, these openings being normally closed by shutters 5 or similar closures which may be provided with suitable means for locking the same as at 6. The housing or superstructure above described is constructed to be as nearly air tight as is possible and in this connection it will be understood that various modes of packing common in the joints thereof may be resorted to. A roof 7 is arranged on the top of the superstructure, and is capable of being removed in order that filling of the silo can be readily effected.

Positioned in the housing or superstructure is the container proper of the silo which is substantially square in cross section and comprises side and end walls 8 and 9 composed of superposed interlocked boards. These boards forming said side and end walls are preferably additionally braced by vertical bars 10 or like means carrying bolts 11 engaging each of said boards and thus lending materially to the rigidity of the container whereby to prevent relative movement between the same by reason of the constant pressure thereon from the ensilage when arranged in said container. To facilitate discharge of ensilage from the container, a chute 12 is placed in the lower portion of the same and is provided with slidable side portions 13 having connection with the end walls 9, the purpose of which will be presently described, while a way of the desired size is formed in lower portion of one of said end walls 9 and is so arranged with relation to the lower end of the chute 12 as to form an outlet or discharge way for the ensilage received thereon.

As will be appreciated, expansion and contraction of ensilage in the container will occur by reason of variance in atmospherical temperature and in order that the container may compensate for such action, it is to be noted that the side and end walls of the same are relatively movable. Inwardly extending arms 14 having their inner ends bifurcated as at 15 are passed through the side walls of the super-structure and receive in said bifurcated ways adjusting wedges 16 adapted to engage adjacent portions of said side and end walls 8 and 9 of the container; these arms 14 and their respective wedges 16 being positioned at points in proximity to the opposite side extremities of the walls and so that they can be readily reached from the openings in said side and end walls with a hammer or other implement whereby they can be adjusted to move the walls inwardly or outwardly to compensate for the contraction or expansion of the ensilage in the container.

The way formed in the lower portion of the hereinbefore mentioned side wall 8 is provided with an outwardly swingable inclosure 17 to prevent the discharge of ensilage from the container and to add to the air lightness of the same.

From the foregoing description it will be understood that in using my improved silo, ensilage can be removed from the same by way of its bottom, thereby, dispensing with considerable effort and labor as caused by those types of silos requiring removal of ensilage from their tops. To remove ensilage from my silo, it is only necessary to open the several doors 4 and 17 whereupon, a spade or other implement may be employed to loosen the same for facilitating its removal. Due to the provision of the movable side and end walls 8 and 9 of the container, it will be also understood that the binding of the ensilage therein by reason of expansion of the same can be avoided by merely moving the adjusting wedges to permit of outward movement of said side and end walls thus relieving the same of lateral stress. Further, as heretofore stated, the transmission of excessive stress to the walls of the container may be avoided by adjusting the same through the wedges 16, while said walls may be also adjusted to render the bulk of ensilage compact in the event of contraction thereby, tending to exclude all air from the same and maintaining it in a state of perfect preservation. Movement of the end walls of the container without effecting the chute 12 will be permitted by reason of the provision of the slidable side portions 13.

As shown in the Fig. 6 the manner in which the adjusting wedges 16 are arranged and operated may be modified, the same in this particular modification, being used in connecting the frame 18 substantially square in cross-section and having seats 19 formed in certain of its extremities adapted to receive oppositely disposed adjusting wedges 16' therein. These wedges 16' act upon the adjacent sides of the frame 18, which as will be noted, are movable, in a manner to cause inward or outward movement of the adjacent and movable walls 9' of the silo container to permit of the desired adjustment of the same.

Manifestly, the construction shown is capable of considerable modification, and such modification as is within the scope of my claims, I consider within the spirit of my invention.

What I claim is:

1. A silo including a housing, a container therein composed of relatively adjustable side and end walls, inwardly disposed arms carried by said housing, and wedges engageable with said arms and portions of said side and end walls for effecting relative adjustment between the same.

2. A silo including a housing, a container therein composed of relatively adjustable side and end walls, said housing having a way in its lower portion, a chute in the lower portion of said container, inwardly disposed arms carried by the housing, and wedges engageable with said arms and side and end walls for effecting relative adjustment between the same.

3. A silo including a superstructure, an expansible and contractile container in said superstructure, and structure for effecting contraction of said container and permitting expansion thereof.

4. A silo including a superstructure, an expansible and contractile container therein, structure for effecting contraction and means in the superstructure and container for facilitating removal of ensilage from the bottom thereof.

In testimony whereof I affix my signature in presence of a witness.

HERBERT WADSWORTH.

Witness:
EDNA JAMES SHEEHY.